2 Sheets—Sheet 1.

D. E. ROE.

FLY-TRAP.

No. 6,853. Reissued Jan. 11, 1876.

WITNESSES

T. H. Bates

C. N. Searle

INVENTOR.

David E. Roe.

Gilmore & Co.

ATTORNEYS.

N. PETERS, PHOTO-LITHOGRAPHER, WASHINGTON, D. C.

D. E. ROE.

FLY-TRAP.

No. 6,853. Reissued Jan. 11, 1876.

WITNESSES

E. H. Bates

C. M. Searle.

INVENTOR,

David E. Roe.

Gilmore & Co.

ATTORNEYS.

N. PETERS, PHOTO-LITHOGRAPHER, WASHINGTON, D. C.

UNITED STATES PATENT OFFICE.

DAVID E. ROE, OF AYER, MASSACHUSETTS.

IMPROVEMENT IN FLY-TRAPS.

Specification forming part of Letters Patent No. 161,354, dated March 30, 1875; reissue No. 6,853, dated January 11, 1876; application filed December 29, 1875.

*To all whom it may concern:*

Be it known that I, DAVID E. ROE, of Ayer, in the county of Middlesex, State of Massachusetts, have invented certain Improvements in Fly-Traps, of which the following is a specification:

My invention relates to that class of fly-traps in which a cone and receiver are used over the bait, the latter retaining the flies until they are removed. It is designed to allure or attract the flies, and to lead or tole them into the cone-shaped receptacle, from whence they will pass into the receiver.

My invention consists in substituting for the bait-cup in ordinary use a mat of cloth or other suitable absorbing material. It further consists in constructing the cone with a swelled or enlarged lower part, and in such manner that the lower end of the receiver shall, in being passed down to its seat, be pressed outward by said cone, and thereby held securely in position. It consists, also, in so constructing the base of the trap and the legs of the cone that the latter shall be readily secured to the former in the manner hereinafter described, without employing any additional latch-spring or other fastening device.

Figure 1:
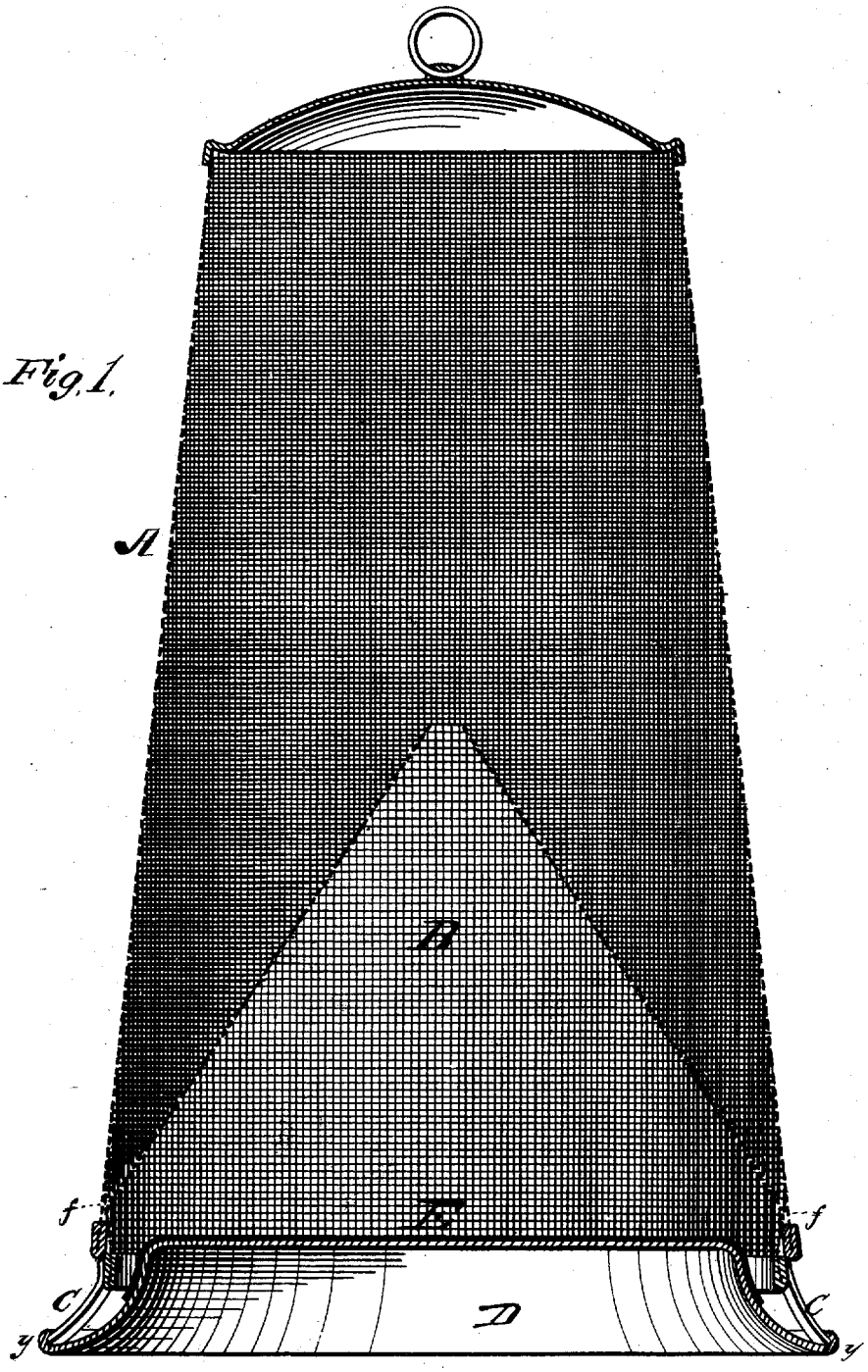
Figure 2:
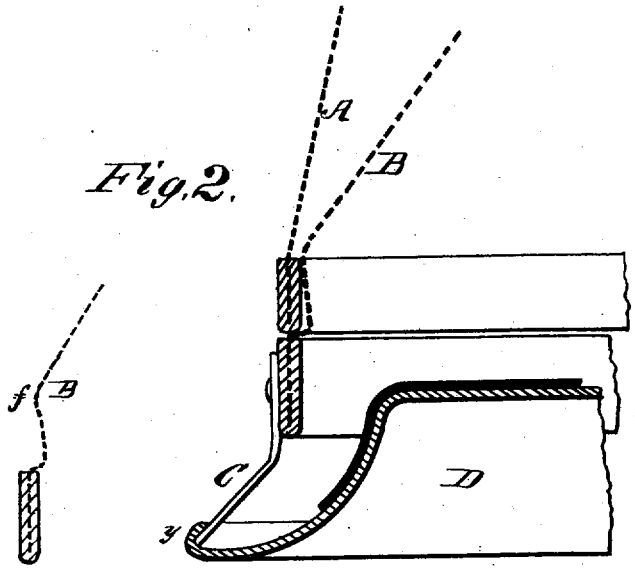
Figure 3:
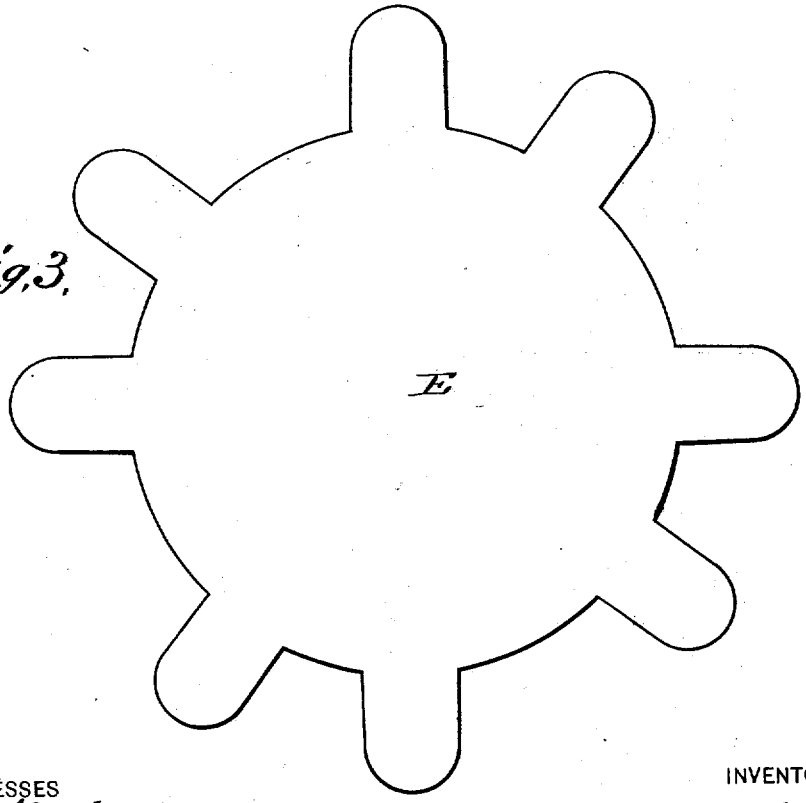

In the accompanying drawings, Figure 1 is a side view of a trap embodying my invention. Fig. 2 is a central vertical section of a portion of the lower parts of the same, and Fig. 3 shows the removable mat and its leaders.

D is the base or bottom, made with a flat top and sloping sides, with the lower edge turned over to form a catch to receive and retain the ends of the legs C C, and yet allow them to be removed by springing them slightly together. The rim of the base is marked *y* on the drawings, and the method of connecting the legs C therewith is fully illustrated on Fig. 2 of the drawings. This is at once an economical and effective mode of securing the cone to the base. These legs are attached to and support the cone B, which is made enough larger than the top of the base D (over which it is held by legs C C) to leave room for the flies to pass between them. The cone B has a small hole or holes in its top, through which the flies can pass into the receiver A above.

E is the mat, made of any retentive or absorbing substance, such as cloth or paper, to retain the bait, sweetened water, molasses or sugar, or anything attractive to the flies, and lying on the top of D, with its leaders or projecting portions lying on the sides, between the base D and the rim of the cone B, and slightly projecting beyond the latter, so as to present some of the bait openly to the sight and smell of the flies, and also to allure them into the cone B, giving them foot-hold, or something to walk upon, instead of wading in the bait, as is usual in most fly-catchers.

When necessary to remove the mat, either to renew the bait or to remove any that may have become offensive, it can be done by springing one of the legs C slightly. It will slip out of the turned edge of the base, and allow the cone B and the mat E to be removed. The legs C C both retain and support the cone B on the base D, and the cone B, in its turn, supports the receiver A, which is made to fit closely over the lower or swelled portion of said cone, and rest upon the lower rim of the cone, to which the legs C are attached.

The swell or enlargement upon the cone is marked *f* on the drawings. Dead flies, which would otherwise accumulate between the side of the cone and the receiver, may be removed by detaching the receiver from the cone, and thereby obviating the difficulty heretofore encountered of digging them out with a pointed stick or other implement.

By making the legs C C a little longer, the lower edge of B may be left a little above the top of the base D, and the edge of the mat be exposed without the projections shown in Fig. 3, but I judge it would be easier for the flies to escape, and therefore prefer the form shown, and other variations may be made without departing from the principle of my invention, the peculiarities of which are plainly shown in its operation, which is as follows:

The mat E being wet in all parts with any fluid attractive to the flies, and laid on D, with its leaders lying down on its sides, the cone B is placed over it, leaving the slightly projecting ends in sight, and the receiver A is placed on the cone B. The open nature of the wire cloth of the cone and receiver allows the aroma of the bait on the mat to pass through them in some degree, though necessarily more diffused and less strong than that direct from the exposed edges of the mat E, and as the insect comes near it is attracted by the stronger, and finds free access. They are thus allured direct to the bait on the mat E, and finding good foot-hold, they pass into the cone without having to wade, as in traps as heretofore made with a pan or cup to hold the bait, and others coming crowd those that have alighted, who, following the mat and bait, are decoyed into the cone B, and after eating their fill, or when sated, the light seen through the wire cloth above them suggests that as the way of escape, and, passing up the cone B, they come out of the hole or holes at its top into the receiver A, seldom or never going out the way they passed in.

Having caught the flies in the receiver, it is necessary to have some way to remove them, which has heretofore been accomplished by having the top of the receiver to open, and such as may fall between the cone and receiver are with difficulty removed with a sharp stick or wire, while in mine, by having the receiver open at its junction with the cone, all the flies can be removed with facility.

This manner of constructing and putting together the trap presents marked advantages for packing for transportation, as the boxes, cones, and receivers may be separately nested, and a large number be packed in a small space.

It is obvious that the length of the leaders to the mat E may be regulated to the wishes of the public. While some parties would prefer to have such leaders extend nearly or quite to the base of the cone on which the mat rests, others, deeming them uncomely, would prefer to have them so short as to be nearly invisible to the occupants of the room. I deem it preferable, however, to make said leaders of such length as to be at least slightly visible below the edge of said cone.

What I claim is—

1. The combination of the cone B, having enlargements F, and the receiver, substantially as described.

2. The combination of the base D, rim *y*, and the cone B, having spring legs C C, substantially as specified.

3. In combination with a trap for flies, the mat E, having a radially-extending edge, upon which part of the bait is placed as a decoy.

In testimony that I claim the above I have hereunto subscribed my name in the presence of two witnesses.

DAVID E. ROE.

Attest:
FRANCIS J. MASI,
GEORGE E. UPHAM.